United States Patent [19]

Tusing

[11] 4,281,720
[45] Aug. 4, 1981

[54] LIFT MECHANISM MOUNTED WITHIN HOLLOW MAIN TOOL BAR AND AUXILIARY TOOL BAR MOVED THEREBY

[76] Inventor: Arthur Tusing, P.O. Box 64, Dell, Ark. 72426

[21] Appl. No.: 66,588

[22] Filed: Aug. 14, 1979

[51] Int. Cl.³ .............................................. A01B 73/00
[52] U.S. Cl. .................................... 172/776; 16/138;
 172/126; 172/311; 172/446; 172/662
[58] Field of Search ............. 172/311, 446, 456, 662,
 172/667, 668, 776, 126, 130; 16/128 R, 137,
 138; 254/124; 280/656; 56/228, 385

[56] References Cited

U.S. PATENT DOCUMENTS

| | | | |
|---|---|---|---|
| 2,097,032 | 10/1937 | Marlowe | 254/124 |
| 3,774,693 | 11/1973 | Orthman | 172/311 |
| 3,941,194 | 3/1976 | Orthman | 172/311 |
| 4,023,623 | 5/1977 | Anderson | 172/311 |
| 4,030,551 | 6/1977 | Boetto et al. | 172/126 |
| 4,046,203 | 9/1977 | Ward | 172/456 |
| 4,074,766 | 2/1978 | Orthman | 172/311 |
| 4,098,347 | 7/1978 | Honnold | 172/311 |

Primary Examiner—Richard T. Stouffer
Attorney, Agent, or Firm—Dowell & Dowell

[57] ABSTRACT

An apparatus which is enclosed within a main tool bar carried by a vehicle and is used to raise and lower an auxiliary tool bar or other implement carrier such as a row marker. The apparatus includes a frame having a first portion of a cross-sectional size comparable to the cross-section of the main tool bar and a second portion of a size to be removably mounted within the main tool bar. Such frame supports a fluid cylinder having a guided piston rod the outer end of which is connected to one end of a link and the opposite end of such link is pivotally connected to a tongue carried by the auxiliary tool bar, such auxiliary tool bar being pivotally connected to the first portion of the frame which is mounted on the main tool bar.

4 Claims, 10 Drawing Figures

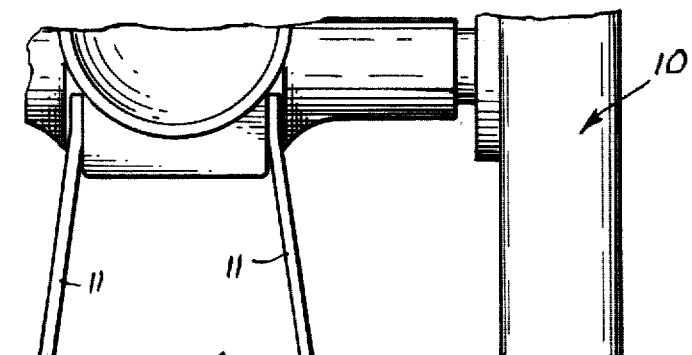
Fig. 1
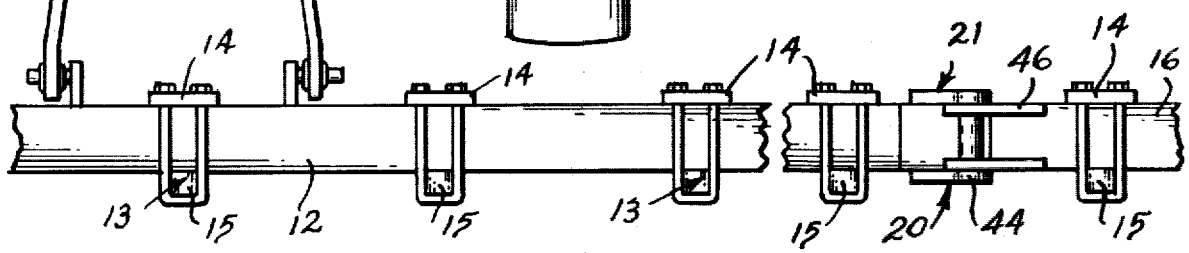
Fig. 2
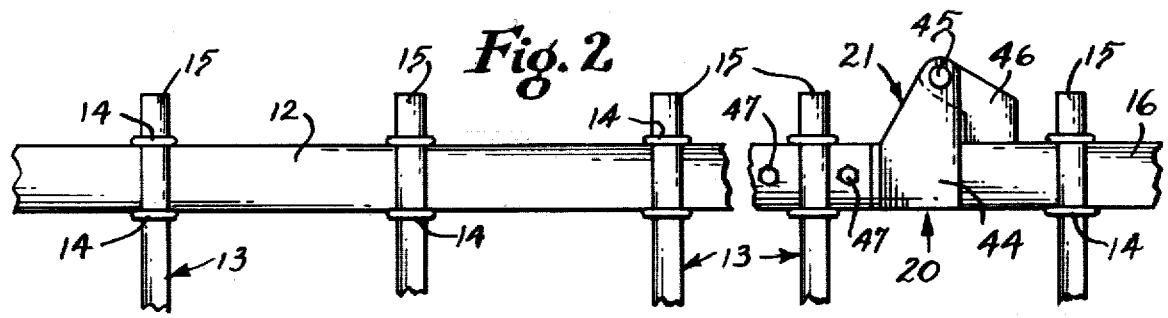
Fig. 3
Fig. 4
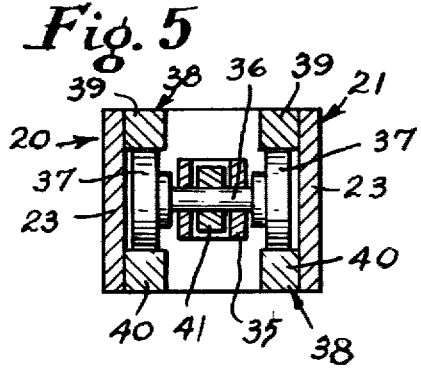
Fig. 5
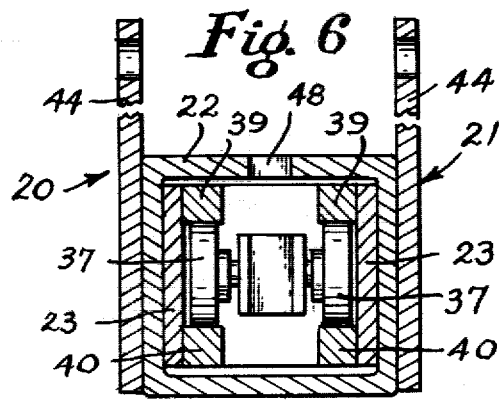
Fig. 6

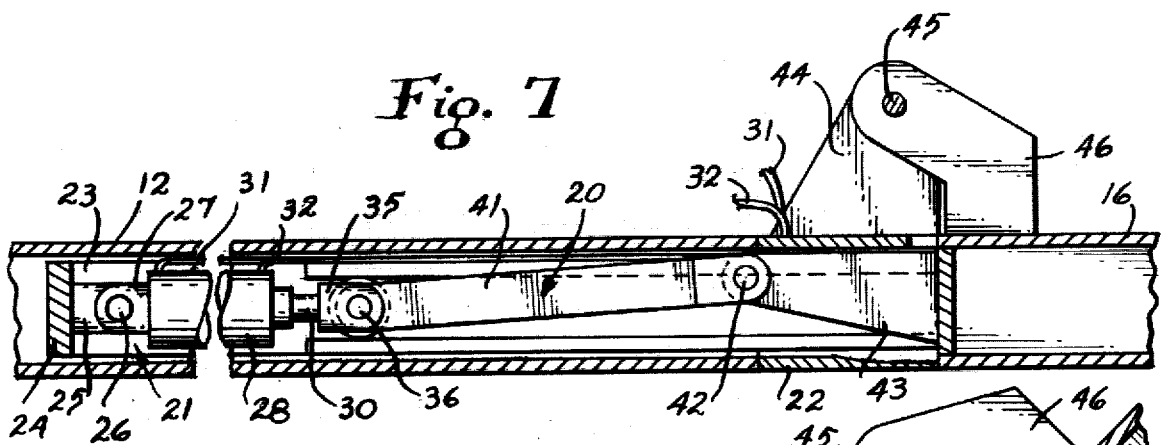
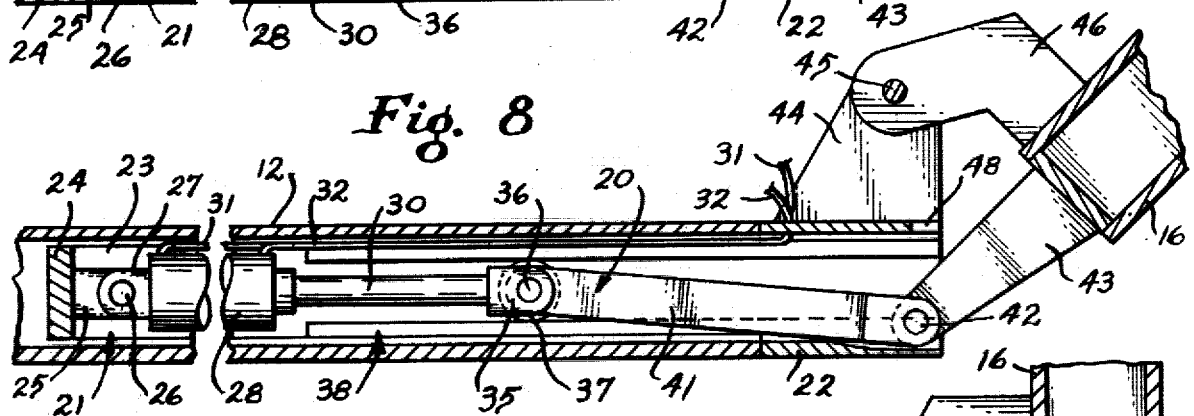
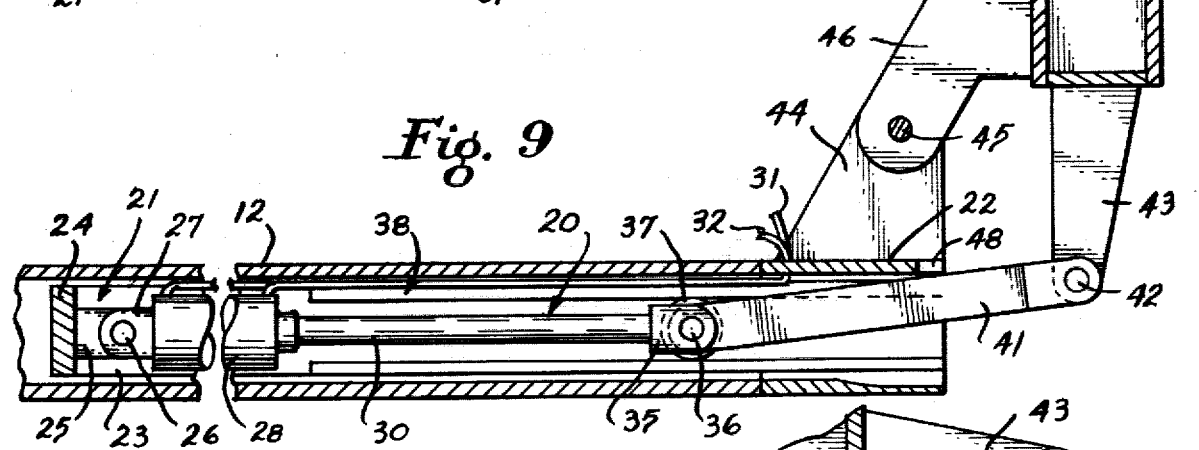
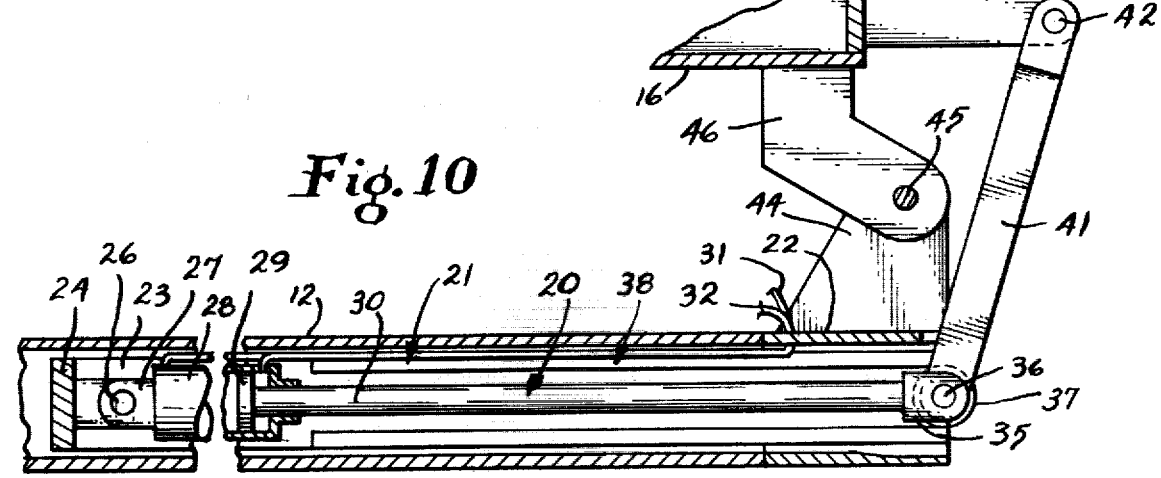

LIFT MECHANISM MOUNTED WITHIN HOLLOW MAIN TOOL BAR AND AUXILIARY TOOL BAR MOVED THEREBY

SUMMARY OF THE INVENTION

The present invention relates generally to tool bars carried by a propelling vehicle and is embodied particularly in an apparatus normally carried by a main tool bar and utilized to selectively raise and lower an auxiliary tool bar, row marker, or the like. In the past, many auxiliary tool bar lift devices have been provided and most of these structures have been mounted on the top of either the main tool bar or the auxiliary tool bar so that the auxiliary tool bar could be pivoted upwardly relative to the main tool bar when the vehicle turned at the end of a row, passed through a gate or other restricted area, or when travelling from place to place. A plurality of earth working implements ordinarily are adjustably mounted on the tool bar to accommodate rows of various widths in accordance with the crop, however, an earth working implement could not be mounted on the tool bar or frame in the area of the lift mechanism mounting structure. Accordingly, the top mounted lift structure has not been satisfactory.

Some efforts have been made to locate the lift mechanism within the main tool bar so that the implements could be mounted along the entire length of the tool bar; however, due to the restricted size of the main tool bar, the lift mechanism normally has included a fluid cylinder having a piston rod with a short stroke. The short stroke of the piston rod has dictated the use of a high pressure cylinder since the leverages are minimal.

In the present invention, a relatively low pressure fluid cylinder having a piston rod with a long stroke is mounted on a frame in such a manner that portions of the frame can be inserted into a conventional main tool bar and can be selectively removed therefrom when desired for service or repair. In this structure, the frame includes a short sleeve which is of substantially the same cross-sectional configuration as the main tool bar and is in aligned abutting relationship therewith. Such sleeve has a pair of outwardly extending ears or lugs on which the auxiliary tool bar is pivotally mounted. The auxiliary tool bar is provided with a relatively long tongue which extends substantially through the sleeve when the main and auxiliary tool bars are in alignment with each other and such tongue is pivotally connected to one end of a link, the opposite end of which is pivotally connected to the exposed end of the piston rod. The exposed end of the piston rod is provided with rollers which are positioned within guideways carried by the frame so that the link normally does not engage the interior wall structure of the main beam.

It is an object of the invention to provide a lift mechanism for an auxiliary tool bar or the like in which such lift mechanism is mounted on a frame, a portion of which is positioned within a conventional main tool bar and including a fluid cylinder having a piston rod with a long stroke which is connected by a link to a tongue carried by an auxiliary tool bar and in which structure substantial mechanical advantage is attained so that a low pressure fluid cylinder may be utilized.

Another object of the invention is to provide a lift mechanism for an auxiliary tool bar in which a portion of the apparatus is normally mounted within a conventional main tool bar but which can be easily removed for service and repair.

BRIEF DESCRIPTION OF THE DRAWINGS

FIG. 1 is a fragmentary top plan view illustrating one application of the invention.

FIG. 2 is a side elevational view thereof.

FIG. 3 is a side elevational view of the apparatus per se.

FIG. 4 is a top plan view thereof.

FIG. 5 is an enlarged sectional view taken on the line 5—5 of FIG. 4.

FIG. 6 is an enlarged sectional view taken on the line 6—6 of FIG. 4.

FIG. 7 is a fragmentary sectional view illustrating the apparatus of the present invention with the auxiliary tool bar in an operating position.

FIG. 8 is a view similar to FIG. 7 showing the auxiliary tool bar in an inclined position.

FIG. 9 is a view similar to FIG. 7 showing the auxiliary tool bar in a generally vertical position.

FIG. 10 is a view similar to FIG. 7 showing the auxiliary tool bar in a stored position overlying the main tool bar.

DESCRIPTION OF THE PREFERRED EMBODIMENT

With continued reference to the drawings, a tractor or other propelling vehicle 10 is provided having a mast hitch including lift arms 11, the outer ends of which are connected to a conventional main tool bar 12 of hollow generally rectangular construction. Normally a plurality of earth working tools or implements 13 are mounted on the main tool bar in any conventional manner, such as by clamps or the like 14 which engage the posts or standards 15 of the earth working implements and secure such implements in fixed adjusted position on the tool bar. Usually the earth working implements are adjustably mounted on the tool bar to compensate for varying widths of the hills and furrows. In some instances the implements are aligned with the hills, particularly during the plowing and planting of the crop, and in other instances are aligned with the furrows after the plants have sprouted and it is necessary to cultivate the soil to remove weeds and other undesirable growths from between the rows.

A relatively large tractor or other propelling vehicle 10 has sufficient power to pull enough implements to treat substantially 16 to 20 rows at a time. However, a main tool bar of a length to cover this many rows could not pass through farm gates and other restricted areas and could not be moved along public thoroughfares. Accordingly, a main tool bar 12 is provided which is mounted on the tractor 10 and one or more auxiliary tool bars 16 are mounted on the ends of the main tool bar in such a manner that the auxiliary tool bars may be pivoted upwardly relative to the main tool bar when desired. The auxiliary tool bars also are provided with earth working tools or implements 13 and if desired may also include one or more gauge wheels (not shown). Additionally, the auxiliary tool bar 16 may have a row marker (not shown) extending outwardly from the end and such row marker normally includes an elongated arm having a disk or other marker at its outer end that makes a mark in the surface of the earth which the operator of the tractor uses as a guide in his next pass through the field. Ordinarily, the row marker is raised relative to the auxiliary tool bar prior to raising the auxiliary tool bar.

In order to mount the auxiliary tool bar or other implement carrier 16 on the main tool bar in a manner to permit the earth working implements 13 to be mounted selectively along substantially the entire length of the main and auxiliary tool bars, a lift mechanism 20 is provided which includes a frame 21 having a short hollow generally rectangular sleeve 22 at one end of substantially the same cross-sectional configuration as the main tool bar 12. A pair of side members 23 of a size to be received within the main tool bar 12 are welded or otherwise attached to the inner surface of the hollow sleeve 22 and extend outwardly from one end generally parallel with the axis thereof. The ends of the side members remote from the sleeve 22 are welded or otherwise fixed to a cross member 24 having a tongue or lug 25 located generally centrally thereof and extending toward the sleeve 22. The tongue 25 is connected by a pin 26 to a pair of mounting lugs 27 fixed to one end of a fluid cylinder 28. Such fluid cylinder includes a piston 29 (FIG. 10) connected to one end of a piston rod 30 which extends out of the cylinder at the end remote from the mounting lugs 27.

The fluid cylinder 28 has fluid lines 31 and 32 connected to opposite ends of the cylinder and such lines extend along the frame 21 and pass through openings 33 and 34 (FIG. 4) in the upper wall of the hollow sleeve 22. The opposite ends of such fluid lines are connected to any convenient source of fluid under pressure, such as the hydraulic system of the tractor 10. It is apparent that when fluid under pressure is introduced into the fluid line 31, the piston rod 30 will be extended, while fluid within the cylinder is exhausted through the fluid line 32. When the direction of movement of the fluid under pressure is reversed, the piston rod 30 will be retracted.

Since the space within the main tool bar 12 is restricted in all directions except the longitudinal direction, it is important that the outer end of the piston rod be limited to substantially straight line movement axially of the main tool bar. Accordingly, the outer end of the piston rod is attached to a clevis 35 which supports a transversely extending shaft 36. A roller or wheel 37 is mounted on each end of the shaft 36 and each of such rollers is located within a guideway 38 defined by upper and lower tracks 39 and 40 which are welded or otherwise attached to the side members 23 of the frame. One end of a link 41 is pivotally connected to the shaft 36 and the opposite end of such link is connected by a pivot 42 to an elongated tongue 43 which is attached to the auxiliary tool bar 16.

In order to mount the auxiliary tool bar 16 in a manner that it can be pivotally raised relative to the main tool bar 12, the sleeve 22 of the lift mechanism 20 is provided with a pair of upwardly extending ears or lugs 44 which are welded or otherwise attached to opposite sides thereof. The upper ends of the ears 44 are located a substantial distance above the upper surface of the sleeve 22 and are connected to each other by a pivot pin 45 which rotatably receives a pair of arms 46 fixed to the auxiliary tool bar 16.

After a portion of the frame 21 has been inserted into the main tool bar and the sleeve 22 is in abutting relationship therewith, such frame 21 may be locked in fixed position in any desired manner, such as two or more bolts 47 which extend through openings in the main tool bar and are threadedly received within cooperating openings in the side members 23. When it is desired to remove the lift mechanism from the tool bar for service or maintenance purposes, such mechanism may be slid axially outwardly of the main tool bar as soon as the bolts 47 have been removed. The auxiliary tool bar 16 may be easily removed from the lift mechanism by removing pins 42 and 45.

With particular reference to FIGS. 4 and 6-10, a recess 48 may be provided in the upper wall of the sleeve 22 to accommodate the link 41 when the auxiliary tool bar 16 is being moved to a position overlying the main tool bar 12.

In the operation of the apparatus, assume that the main tool bar 12 and the auxiliary tool bar 16 are in a normal horizontal position with the earth working implements 13 equally spaced along the main tool bar 12 and the auxiliary tool bar 16 and engaging the earth as the tractor 10 pulls the tool bars along a field. At the end of the row the operator of the tractor operates his hydraulic system to introduce fluid under pressure into the fluid line 31 and such fluid under pressure passes into the end of the fluid cylinder 28 and causes the piston rod 30 to be extended. When the fluid is introduced into the cylinder, the piston rod 30 is extended in a substantially straight line due to the rollers 37 moving along the guideways 38 and such piston rod applies a pushing force to the link 41 to cause the auxiliary tool bar 20 to pivot upwardly about the pivot pin 45. Due to the length of the tongue 43 and the connecting link 41, a substantial mechanical advantage is realized so that a substantially low pressure fluid cylinder having a long stroke may be utilized to raise the auxiliary tool bar about the fixed pivot 45.

Although the lift mechanism 20 has been illustrated and described as being inserted into the main tool bar 12 and used to raise the auxiliary tool bar 16, it is apparent that the frame 21 of the lift mechanism could be inserted into the auxiliary tool bar and attached to a tongue 43 carried by the main tool bar.

Also it is noted that even though a relatively long frame and fluid cylinder have been used, the entire length of the main tool bar 12 and most of the length of the auxiliary tool bar 16 are free of projections so that the earth working implements 13 may be located where desired.

I claim:

1. A lift mechanism mounted within a hollow main tool bar, an auxiliary tool bar, said lift mechanism being used to move said auxiliary tool bar out of axial alignment with said main tool bar, comprising a frame, said frame including a first portion of a size to be received within said main tool bar and a second portion having a cross-sectional configuration generally similar to the configuration of said main tool bar, means for removably attaching said frame to said main tool bar, fluid cylinder means mounted on said first portion of said frame, said fluid cylinder means having piston rod means with a free end extending toward said second portion of said frame, means on said frame for guiding said piston rod means along a path generally axially of said frame, support means carried by said second portion of said frame, means for pivotally mounting said auxiliary tool bar on said support means, said auxiliary tool bar having a tongue with a free end extending into said second portion of said frame when said main and auxiliary tool bars are generally axially aligned, and link means connected at one end to the free end of said piston rod means and connected at the other end to the free end of said tongue, whereby operation of said fluid cylinder means in one direction causes said piston rod means to be extended axially of said main tool bar and said link means causes said auxiliary tool bar to be moved out of axial alignment with said main tool bar.

2. The structure of claim 1 in which said second portion of said frame is in abutting relationship with one end of said main tool bar.

3. The structure of claim 1 in which said means for guiding said piston rod means includes a shaft carried by said piston rod means and generally normal to the axis thereof, wheel means mounted on each end of said shaft and track means carried by said first portion of said frame in a position to receive said wheel means.

4. A lift mechanism having portions mounted within a hollow main tool bar, an auxiliary tool bar, said lift mechanism being used to elevate one end of said auxiliary tool bar so that the auxiliary tool bar is moved out of alignment with the main tool bar, said lift mechanism comprising a frame including a hollow sleeve having a cross-sectional configuration similar to the cross-sectional configuration of the main tool bar, a pair of elongated side members having one end fixed to the inner surface of said sleeve, portions of said side members being inserted into said main tool bar and said sleeve being in abutting relationship with one end of said main tool bar, a fluid cylinder mounted on said frame between said side members and having piston rod means with a free end extending toward said sleeve, said free end of said piston rod means being connected to a transversely extending shaft, wheel means rotatably mounted on each end of said shaft, upper and lower track means fixed to said side members in a position to guide said wheel means and cause said piston rod means to move generally axially of said frame, said auxiliary tool bar having a tongue with a free end extending into said sleeve, link means pivotally connected at one end to the free end of said piston rod means, the opposite end of said link means being pivotally connected to the free end of said tongue, at least one support member fixed to said sleeve and extending upwardly therefrom, at least one arm carried by said auxiliary tool bar, said arm being pivotally connected to said support member is spaced relationship with said sleeve, whereby operation of said fluid cylinder in one direction causes said piston rod means to be extended axially of said frame and said link means causes said auxiliary tool bar to be moved out of axial alignment with the main tool bar.

* * * * *